(12) United States Patent
Raio et al.

(10) Patent No.: US 6,467,400 B2
(45) Date of Patent: *Oct. 22, 2002

(54) DIGITALLY CONTROLLED CLAMSHELL PRESS

(75) Inventors: Steve M. Raio, Yorba Linda, CA (US); John J. Boyer, Yorba Linda, CA (US)

(73) Assignee: ProProcess Corporation, Paramount, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/911,747

(22) Filed: Jul. 23, 2001

(65) Prior Publication Data

US 2002/0033101 A1 Mar. 21, 2002

Related U.S. Application Data

(63) Continuation-in-part of application No. 09/622,568, filed on Sep. 15, 2000, now Pat. No. 6,263,786.

(51) Int. Cl.[7] ............................ A47J 27/62; A47J 37/00; A47J 37/06
(52) U.S. Cl. ............................ 99/349; 99/353; 99/374; 99/379; 100/92
(58) Field of Search ........................ 99/349, 353–355, 99/372–379, 383, 389, 390, 391, 422–426, 380, 394; 219/521, 524, 525, 443, 388; 425/136, 151, 317, 160, 293, 298, 324.1, 343, 394; 100/92, 315, 319, 320, 323, 441; 426/496, 513, 523, 285, 138, 143, 243, 274, 451, 557, 512, 514, 499

(56) References Cited

U.S. PATENT DOCUMENTS

| | | |
|---|---|---|
| 2,280,324 A | 4/1942 | Tracy |
| 3,068,778 A | 12/1962 | Majerus ........................ 99/375 |
| 3,108,533 A | 10/1963 | Read et al. .................... 100/98 |
| 3,565,015 A | 2/1971 | Jorgensen |
| 3,761,216 A | 9/1973 | Duarte et al. |
| 3,814,005 A | 6/1974 | Widdel ......................... 99/349 |
| 3,844,701 A | 10/1974 | Rockwell ..................... 425/348 |
| 3,947,204 A | 3/1976 | Ayres et al. |
| 4,060,365 A | 11/1977 | Duarte et al. |
| 4,303,677 A | 12/1981 | De Acetis ..................... 426/27 |
| 4,417,867 A | 11/1983 | Bauer |
| 4,508,025 A | 4/1985 | Schultz ......................... 99/353 |
| 4,511,324 A | 4/1985 | Bauer |
| 4,559,002 A | 12/1985 | Atwood |
| 4,601,237 A | 7/1986 | Harter et al. .................. 99/349 |
| 4,634,365 A | 1/1987 | Triporo et al. |

(List continued on next page.)

OTHER PUBLICATIONS

DOUGHPRO 6000 Series Advertisement 3 pages, undated.
DOUGHPRO Model DP 1100 Advertisement 1 page, undated.
DOUGHPRO Model 1800 Advertisement 1 page, undated.
DOUGHPRO Model DP 1400 Advertisement 2 pages, undated.

*Primary Examiner*—Timothy F. Simone
(74) *Attorney, Agent, or Firm*—Stetina Brunda Garred & Brucker

(57) ABSTRACT

There is provided a manually actuated press comprising a housing having a lower platen attached thereto. The lower platen defines a generally planar top surface. Moreover, at least one upper platen is in mechanical communication with the housing and defines a generally plated bottom surface. The at least one upper platen is translatable with respect to the lower platen in a manner forming a generally parallel relationship between the bottom and top surfaces when within a prescribed distance range therefrom. Further, the at least one upper platen is rotatable with respect to the lower platen when exceeding the prescribed distance range.

17 Claims, 7 Drawing Sheets

U.S. PATENT DOCUMENTS

| | | |
|---|---|---|
| 4,669,373 A | 6/1987 | Weimer et al. ............ 99/372 X |
| 4,696,823 A | 9/1987 | Dechristopher |
| 4,697,504 A | 10/1987 | Keating ........................ 99/331 |
| 4,700,619 A | 10/1987 | Scanlon ........................ 99/349 |
| 4,763,571 A | 8/1988 | Bergling et al. .............. 99/349 |
| 4,769,252 A | 9/1988 | Escmilla |
| RE32,994 E | 7/1989 | Adamson et al. ............. 99/332 |
| 4,972,766 A | 11/1990 | Anetsberger ................. 99/332 |
| 4,973,240 A | 11/1990 | Reilly ........................ 425/195 |
| 4,987,827 A * | 1/1991 | Marquez ..................... 99/331 |
| 5,070,775 A | 12/1991 | Blake ....................... 99/422 X |
| 5,135,036 A | 8/1992 | Caron ........................ 144/286 |
| 5,147,661 A | 9/1992 | Kurumaji et al. ........... 425/150 |
| 5,156,782 A | 10/1992 | Ballantyne ................. 264/40.5 |
| 5,197,377 A | 3/1993 | Jennings et al. ............... 99/349 |
| 5,282,732 A | 2/1994 | Eggert ........................ 425/153 |
| 5,341,727 A * | 8/1994 | Dickson ...................... 99/335 |
| 5,417,149 A | 5/1995 | Raio et al. |
| 5,423,253 A | 6/1995 | Olson et al. ................... 99/351 |
| 5,469,779 A | 11/1995 | Amore et al. ................. 99/349 |
| 5,513,538 A | 5/1996 | Erickson et al. .......... 99/331 X |
| 5,570,625 A | 11/1996 | Liebermann ................. 99/330 |
| 5,640,895 A | 6/1997 | Anetsberger ................. 99/349 |
| 5,755,150 A * | 5/1998 | Matsumoto et al. .......... 99/334 |
| 5,800,844 A | 9/1998 | Raio et al. ..................... 425/150 |
| 6,263,786 B1 | 7/2001 | Raio et al. .................... 99/349 |

* cited by examiner

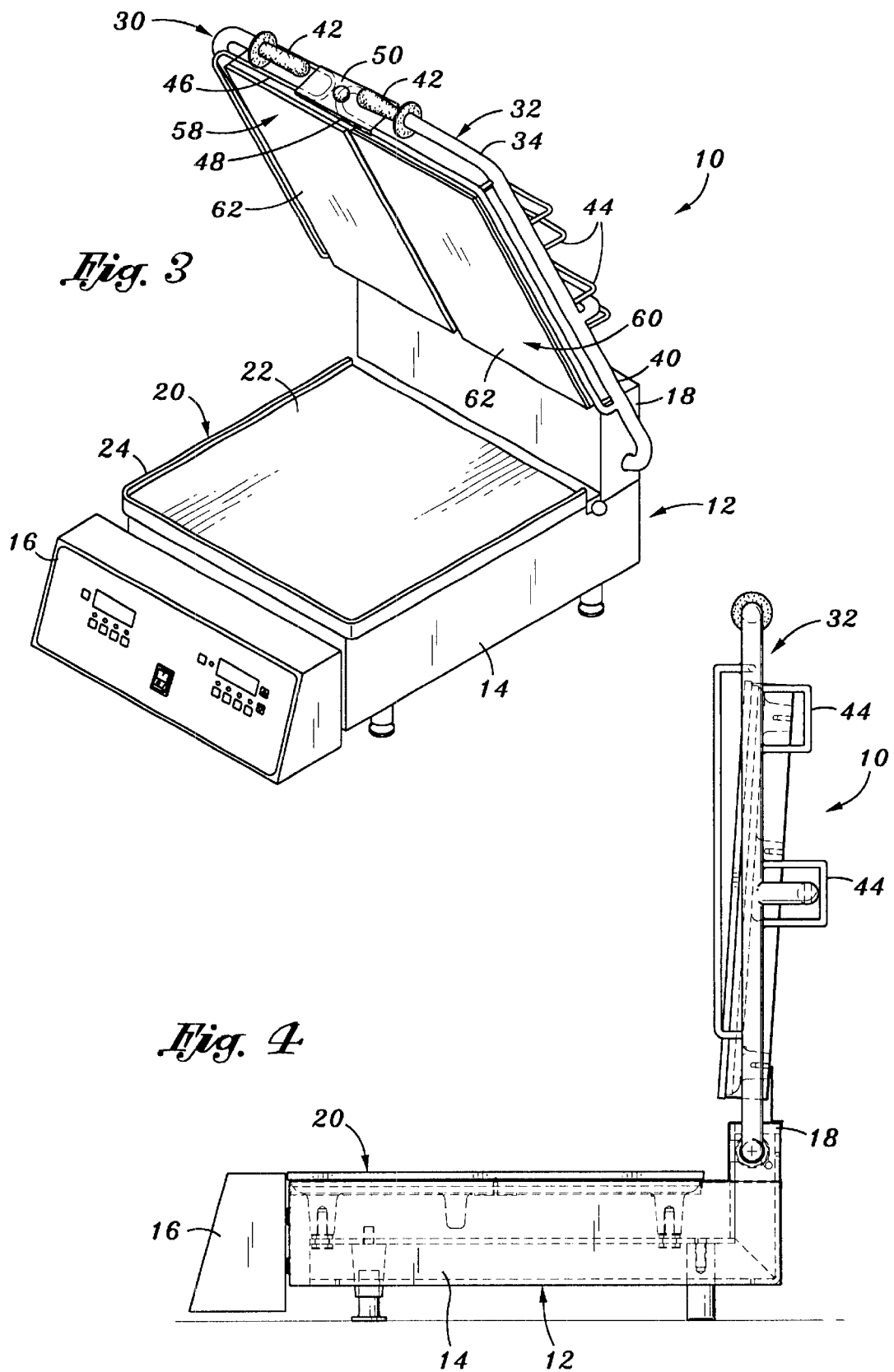

DIGITALLY CONTROLLED CLAMSHELL PRESS

CROSS-REFERENCE TO RELATED APPLICATIONS

The present application is a continuation-in-part of U.S. application Ser. No. 09/622,568 entitled DIGITALLY CONTROLLED CLAMSHELL PRESS, filed Sep. 15, 2000, now U.S. Pat. No. 6,263,786 the disclosure of which is expressly incorporated herein by reference.

STATEMENT RE: FEDERALLY SPONSORED RESEARCH/DEVELOPMENT (Not Applicable)

BACKGROUND OF THE INVENTION

The present invention relates generally to food preparation devices, and more particularly to a digitally controlled, manually actuated clamshell press including left and right upper platen sections which are individually or concurrently movable between loading/unloading and press positions, and are each rotatable into substantially parallel relation with a common lower platen during movement from the loading/unloading position to the press position.

Widely known in the food service industry are various heat press devices which are used to aid in the preparation of various food items. Such presses are often found in those commercial establishments specializing in the preparation of Mexican food and pizzas, and are used in relation to the production of, for example, tortillas, pizza crusts, and other food items (e.g., quesadillas) wherein a quantity of dough is compressed or flattened while simultaneously baked.

Though generally satisfying the intended food preparation function, such prior art presses suffer from various deficiencies which detract from their overall Be utility. More particularly, in certain prior art presses, an upper platen is pivotally connected to a housing so as to be rotatable or pivotable about a single axis, and thus reciprocally movable in an arcuate path toward and away from a stationary lower platen also attached to the housing. However, in these presses, the bottom surface of the upper platen extends angularly relative to the top surface of the lower platen throughout virtually the entire range of motion of the upper platen toward the lower platen, with the bottom and top surfaces not being parallel until they are virtually in direct contact with each other. As will be recognized, this particular path of movement of the upper platen toward the lower platen results in the uneven application of compressive forces to a quantity of dough or food item placed therebetween. In this regard, compressive forces are applied to those portions of the dough or food item disposed closest to the pivot axis prior to such compressive forces being applied to those portions of the dough or food item disposed furthest from the pivot axis. Since the lower and/or upper platens are heated, those portions of the dough or food item disposed closest to the pivot axis will be baked for a longer period time, and thus are more susceptible to burning or scorching. Even in the absence of such burning or scorching, those portions of the dough or food item disposed furthest from the pivot axis tend to be undercooked relative to those portions disposed closest to the pivot axis due to the arcuate movement path of the upper platen toward the lower platen.

Another deficiency with prior art presses lies in the inability to use only a portion of the upper platen for the flattening/baking operation when the size of the food item being prepared does not require the entire available surface area of the bottom surface of the upper platen. Thus, the entire bottom surface must be heated despite only a relatively small portion thereof being utilized for the flattening/baking process. The need to heat the bottom surface of the upper platen in its entirety despite only a small portion thereof being utilized is energy inefficient and cost ineffective. Moreover, the use of a single upper platen to simultaneously flatten/bake multiple quantities of dough or food items is time and energy inefficient due to the resulting "recovery" time needed between each cycle, i.e., the time needed to allow the upper platen to climb back to its prescribed operating temperature. As will be recognized, cycle times for food items prepared through the use of the press could be greatly increased if the upper platen were segregated into separate sections wherein one section could be used in the flattening/baking process while the remaining section is allowed to recover during a simultaneous loading/unloading process in relation to the food item. In prior art presses, the recovery time is also compromised by the manner in which the heating elements are placed relative to the lower platen. The prior art presses would also be more energy efficient if only portions of the upper and lower platens were heated when use of the entire available surface areas thereof is not required.

The present invention overcomes the above-described deficiencies of prior art heat presses by providing a press wherein the upper platen is separated into left and right sections which may be individually or concurrently moved between loading/unloading and press positions relative to a common, stationary lower platen to maximize cycle times. The present press is further configured such that the bottom surface of each of the left and right sections of the upper platen is "leveled" to extend in substantially parallel relation to the top surface of the lower platen during the movement of such section toward the lower platen, thus eliminating the uneven application of compressive forces and resultant effects as described above. Moreover, in the present press, heating elements are integrated directly into the lower platen in sections which may be individually or simultaneously activated, with the integration of such heating elements directly into the lower platen substantially reducing recovery times during use of the press. These, and other advantages attendant to the present invention, will be discussed in more detail below.

BRIEF SUMMARY OF THE INVENTION

In accordance with a first embodiment of the present invention, there is provided a manually actuated press. The manually actuated press may comprise a housing having a lower platen attached thereto. The lower platen defines a generally planar top surface. Moreover, at least one upper platen may be placed in mechanical communication with the housing. The at least one upper platen defines a generally plated bottom surface. In the preferred embodiment, there may comprise two upper platens.

In the present press, the at least one upper platen may be translatable with respect to the lower platen in a manner forming a generally parallel relationship between the bottom and top surfaces when within a prescribed distance range therefrom. The prescribed distance range may be between 0.1 to 5 inches, preferably about 2.5 inches. After exceeding the prescribed distance range, the at least one upper platen is rotatable with respect to the lower platen.

In the preferred embodiment, at least one heating element may be embedded in the lower platen. Moreover, the same may be provided within the upper platen. The press of the present invention may include an actuation handle having a center portion connected to the at least one upper platen and a second end connected to the housing. Preferably, the housing comprises a back wall and the second end of the actuation handle is pivotally connected thereat. The actuation handle may be selectively movable between a loading/unloading position and a press position relative to the housing.

There may further comprise a stop member which is attached to the housing. The stop member may be operative to engage the at least one upper platen in a manner causing the bottom surface to be extended in generally perpendicular relation to the top surface when the actuation handle is moved to the loading/unloading position. More specifically, a torsion spring may be cooperatively engaged to the actuation handle and operative to maintain the actuation handle in the loading/unloading position.

In accordance with a preferred embodiment of the present invention, a leveling member may be mounted on the at least one upper platen. The leveling member may be configured to facilitate the rotation of the bottom surface into generally parallel relation to the top surface during movement of the actuation handle from the loading/unloading position to the press position. Preferably, the leveling member comprises an elongate linkage having first and second ends. The first end of the elongate linkage may be connected to the leveling member, whereas its second end may be connected to the housing. The second end of the elongate linkage may be pivotally connected at the back wall of the housing.

In the preferred embodiment, the center portion of the actuation handle and the first end of the elongate linkage may be uniformly spaced apart from each other during movement of the actuation handle between the loading/unloading position and the press position. In addition, the second end of the elongate linkage may further be configured to move toward the second end of the actuation handle when moving from the press position to the loading/unloading position. As such, the elongate linkage may crisscross the actuation handle when the loading/unloading position is formed.

BRIEF DESCRIPTION OF THE DRAWINGS

These, as well as other features of the present invention, will become more apparent upon reference to the drawings wherein:

FIG. 3 is a top perspective view of the press of the first embodiment, illustrating the left and right upper platens thereof as being ganged together and simultaneously moved toward their loading/unloading positions;

FIG. 4 is a side-elevational view of the press shown in FIG. 3, illustrating the manner in which the left and right upper platens are engaged by respective stop members;

DETAILED DESCRIPTION OF THE INVENTION

Figure 1:
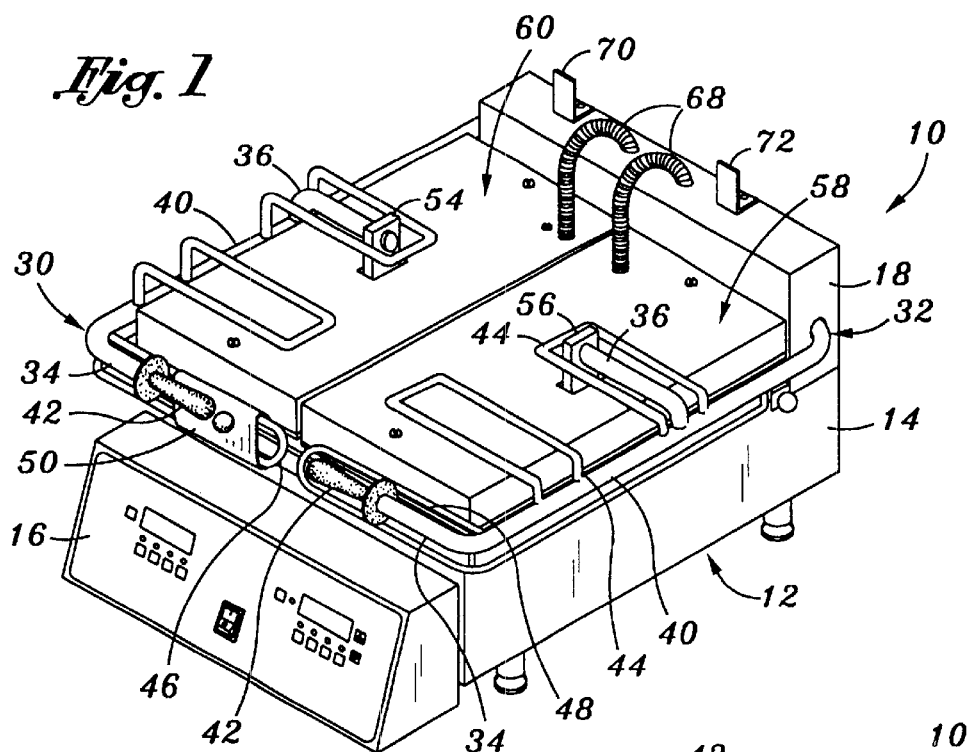
FIG. 1 is a top perspective view of a heat press constructed in accordance with a first embodiment of the present invention, illustrating both the left and right upper platens thereof as being in their press positions.
Figure 2:
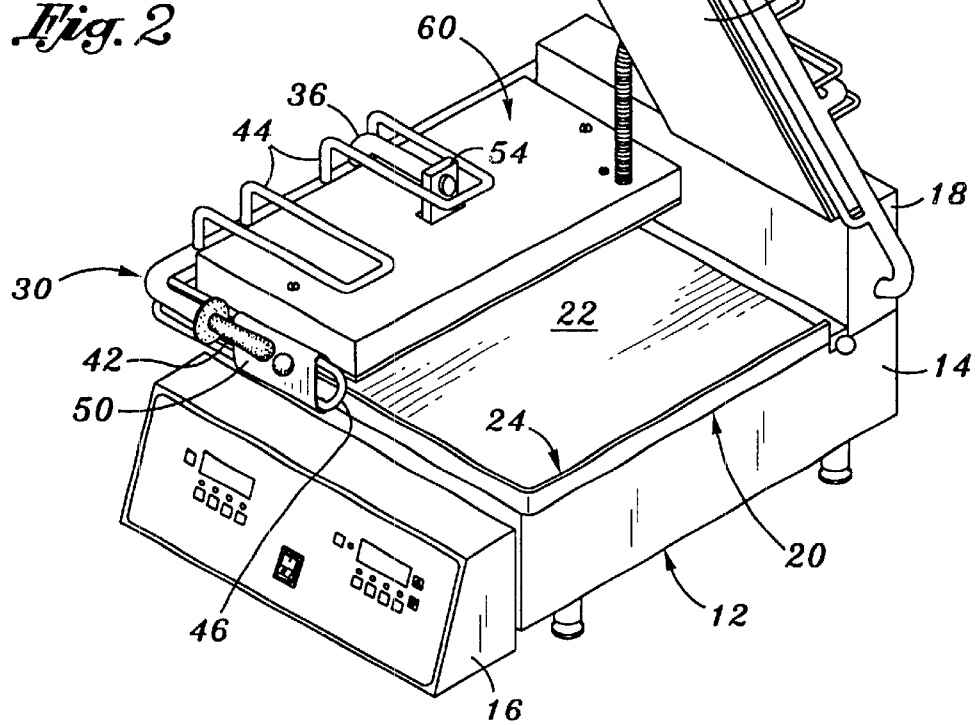
FIG. 2 is a top perspective view of the press of the first embodiment, illustrating the right upper platen thereof being moved toward its loading/unloading position.

Referring now to the drawings wherein the showings are for purposes of illustrating preferred embodiments of the present invention only, and not for purposes of limiting the same, FIGS. 1–3 perspectively illustrate a digitally controlled, manually actuated clamshell type heat press 10 constructed in accordance with a first embodiment of the present invention. The press 10 comprises a housing 12 having a generally square main body 14 and a control panel 16 attached to the front end of the main body 14. In addition to the main body 14 and control panel 16, the housing 12 includes a back wall 18 attached to the top of the main body 14 adjacent the back end thereof. Disposed within the control panel 16 is a control unit of the press 10, the functionality of which will be discussed in more detail below.

Referring now to FIGS. 2, 3, 5 and 6, attached to the top of the main body 14 of the housing 12 is a generally square lower platen 20 of the press 10. The lower platen 20 is preferably fabricated from a metallic material, and defines a generally planar top surface 22. As best seen in FIG. 3, the lower platen 20 is formed to include an integral peripheral rim 24 which extends perpendicularly relative to the top surface 22 along three sides thereof. In this respect, the rim 24 does not extend along that side of the lower platen disposed closest to the back wall 18 of the housing 12.

Figure 5:
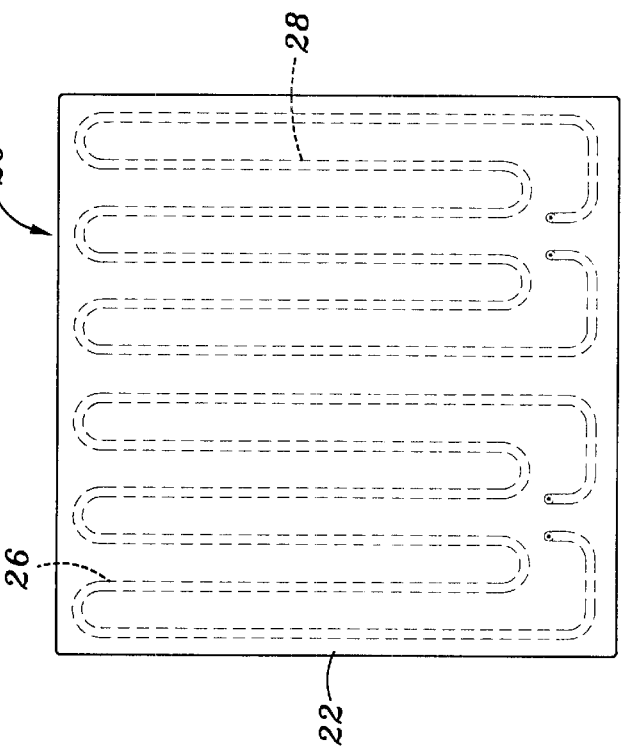
FIG. 5 is a top plan view of the lower platen of the heat press of the first embodiment, illustrating the heating elements embedded the heating elements embedded therein.
Figure 6:
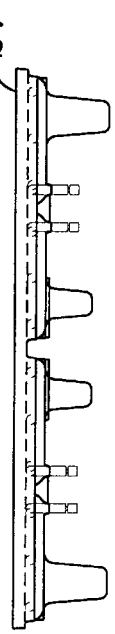
FIG. 6 is a side-elevational view of the lower platen shown in FIG. 5.

As best seen in FIGS. 5 and 6, embedded directly within the lower platen 20 is a left heating element 26 and a right heating element 28. The heating elements 26, 28 are embedded within the lower platen 20 so as to be disposed in close proximity to the top surface 22 defined thereby. The heating elements 26, 28 are each in electrical communication with the control unit of the press 10, and may be individually or simultaneously activated thereby. The control unit also provides the capability for allowing the heating elements 26, 28 to be set to different temperature levels. As will be discussed in more detail below, the integration of the heating elements 26, 28 directly into the metallic material of the lower platen 20 substantially reduces the recovery time associated with the use of the press 10. Additionally, the inclusion of the separate heating elements 26, 28 within the lower platen 20 provides economies in energy consumption in relation to the use of the press 10 when the entire surface area of the top surface 20 is not required in a food preparation process.

Figure 8:
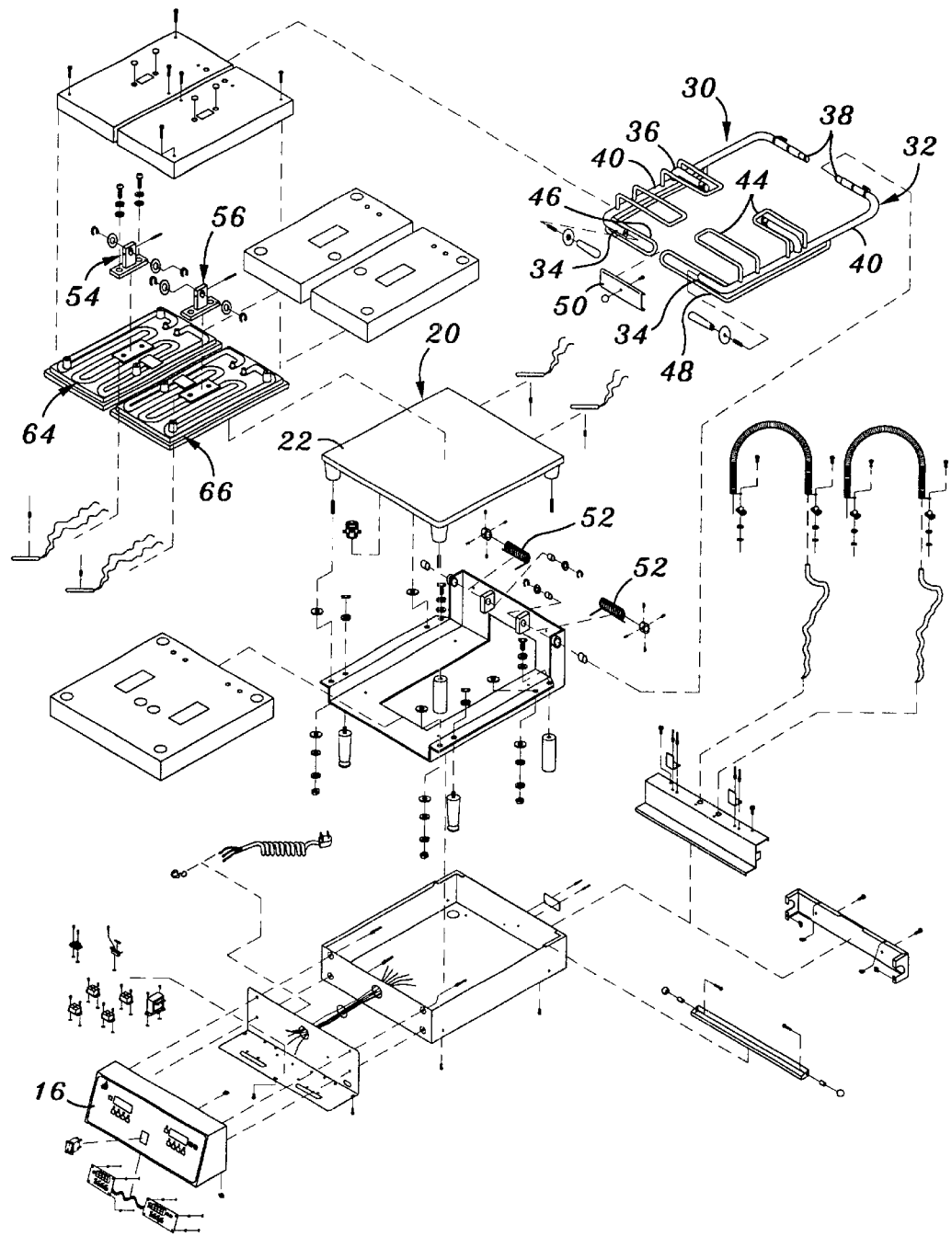
FIG. 8 is a fully exploded view of the heat press of the first embodiment.

The press 10 of the present invention further comprises a left actuation handle 30 and a right actuation handle 32 which are identically configured to each other and pivotally connected to the housing 12. More particularly, the actuation handles 30, 32 are pivotally connected to respective ones of the opposed longitudinal ends of the back wall 18 of the housing 12. As is best seen in FIGS. 1 and 8, the actuation handles 30, 32 each have a generally E-shaped configuration. In this respect, the actuation handles 30, 32 each include front, center and back leg portions 34, 36, 38, respectively, which extend perpendicularly from a common side rail portion 40 in spaced, generally parallel relation to each other. The back leg portions 38 of the actuation handles 30, 32 are advanced into the back wall 18 of the housing 12. The actuation handles 30, 32 further include handle members 42 attached to respective ones of the front leg portions 34. As also seen in FIGS. 1 and 8, the actuation handles 30, 32 each further include a pair of guard members 44 attached to the side rail portion 40 and extending generally perpendicularly relative thereto. One of the guard members 44 extends about the corresponding center leg portion 36. The use of the guard members 44 will be discussed in more detail below.

The press 10 further comprises a latching mechanism which is attached to the actuation handles 30, 32. The latching mechanism comprises a left rail section 46 which is attached to the left actuation handle 30 and extends along and in generally parallel relation to the front leg portion 34 and handle member 42 thereof. Similarly, attached to the right actuation handle 32 is a right rail section 48 which is identically configured to the left rail section 46 and extends along and in generally parallel relation to the front leg portion 34 and handle member 42 of the right actuation handle 32. Slidably attached to the left rail section 46 is a latch member 50.

In the press 10, the left and right actuation handles 30, 32 are each individually movable between a press position (shown in FIG. 1) and a loading/unloading position. When the actuation handles 30, 32 are in the press position, they extend substantially horizontally in generally parallel relation to the top surface 22 of the lower platen 20. When in the loading/unloading position, the actuation handles 30, 32 extend substantially vertically in generally perpendicular relation to the top surface 22 of the lower platen 20. The actuation handles 30, 32 may be moved individually or simultaneously between their press and loading/unloading positions, depending on the configuration of the latching mechanism. In this respect, when the latching mechanism is configured in the manner shown in FIGS. 1 and 2 (i.e., the latch member 50 resides solely on the left rail section 46), the actuation handles 30, 32 are individually movable between their press and loading/unloading positions. When the actuation handles 30, 32 are each moved to the press position, the rail sections 46, 48 are in substantial horizontal, linear alignment. When the rail sections 46, 48 are so aligned, the latch member 50 of the latching mechanism may be slid to the right so as to be partially advanced over the right rail section 48 in the manner shown in FIG. 3. In this orientation, the latch member 50 extends over the distal portions of both the left and right rail sections 46, 48. In this latched position, the actuation handles 30, 32 are "ganged", and thus may be moved in unison between the press and loading/unloading positions. The movement of the latch member 50 back to its unlatched position (shown in FIGS. 1 and 2), allows the actuation handles 30, 32 to once again be moved individually between their press and loading/unloading positions.

As seen in FIG. 8, the press 10 further comprises left and right torsion springs 52 which are cooperatively engaged to the back leg portions 38 of respective ones of the actuation handles 30, 32. The left and right torsion springs 52 are disposed within the interior of the back wall 18 of the housing 12 and are operative to maintain the left and right actuation handles 30, 32, respectively, in the loading/unloading position. The biasing force exerted by the torsion springs 52 against the actuation handles 30, 32 is easily overcome by exerting a relatively slight pulling force on the handle members 42. The actuation handles 30, 32 as well as the guard members 44, rail sections 46, 48 and latch member 50 are each preferably fabricated from stainless steel.

The press 10 of the present invention further comprises identically configured, left and right transitional leveling members 54, 56 which are cooperatively engaged to respective ones of the left and right actuation handles 30, 32. In the press 10, the leveling members 54, 56 each preferably comprise a bearing. The left leveling member 54 is rotatably connected to the left actuation handle 30 via the advancement of a portion of the center leg portion 36 therethrough. Similarly, the right leveling member 56 is rotatably connected to the right actuation handle 32 via the advancement of a portion of the center leg portion 36 therethrough. The functionally imparted to the press 10 by the leveling members 54, 56 will be discussed in more detail below.

Figure 7:
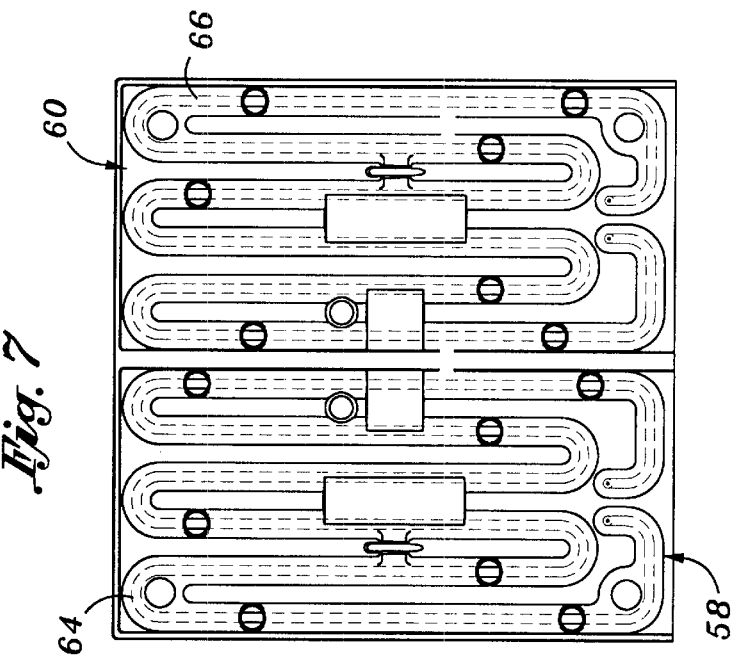
FIG. 7 is a top plan view of the left and right upper platens with the outer covers removed therefrom to illustrate the heating elements disposed therein.

The press 10 of the present invention further comprises identically configured left and right upper platens 58, 60 which are attached to the left and right leveling members 54, 56, respectively. The upper platens 58, 60 each define a generally planar bottom surface 62. The upper platens 58, 60 each have a generally rectangular configuration, with the combined surface area of the bottom surfaces 62 thereof being substantially equal to the surface area of the top surface 22 of the lower platen 20. As best seen in FIGS. 1, 7, and 8, disposed within the interior of the left upper platen 58 is a left heating element 64. Similarly, disposed within the interior of the right upper platen 60 is a right heating element 66. The left and right heating elements 64, 66 are disposed in close proximity to respective ones of the bottom surfaces 62. Additionally, the heating elements 64, 66 are placed into electrical communication with the control unit of the press 10 via respective segments of flexible conduit 68 extending from the upper platens 58, 60. In the alternative, the actuation handles 30, 32 may each define a hollow inside so as to provide a wiring conduit for the heating elements 64, 66 of the upper platens 58, 60. Like the left and right heating elements 26, 28 of the lower platen 20, the left and right heating elements 64, 66 may be individually or simultaneously activated by the control unit. Additionally, the temperature settings of the heating elements 64, 66 may be adjusted to different levels via the control unit of the press 10. The guard members 44 of the actuation handles 30, 32 are used to prevent inadvertent contact with the top surfaces of the upper platens 58, 56 due to the same typically becoming very hot upon the activation of the heating elements 64, 66.

Figure 9A:
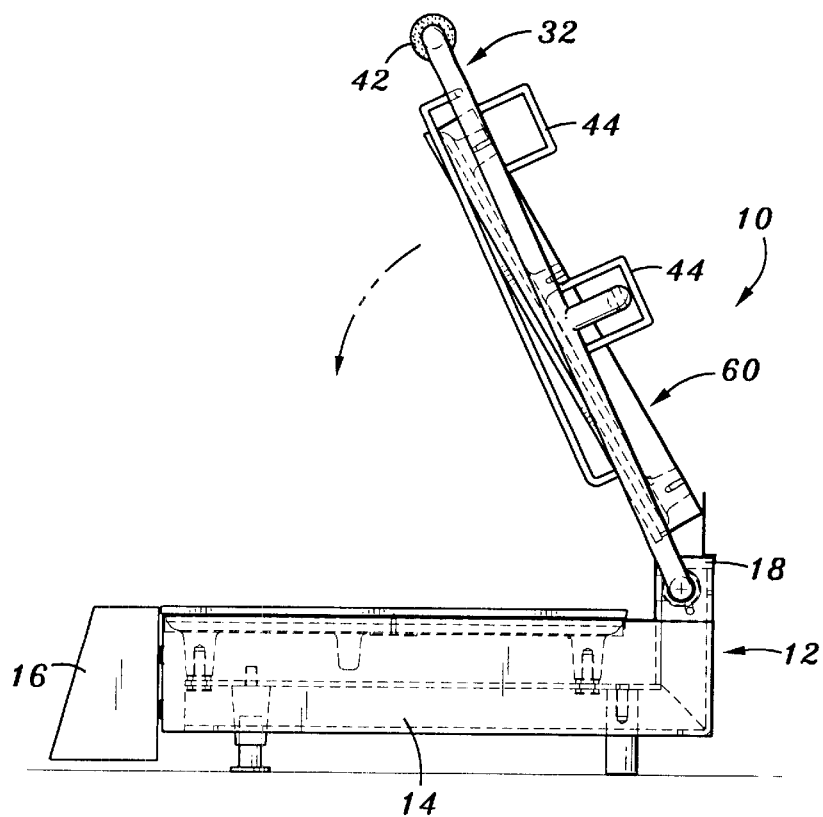
FIGS. 9a, 9b, and 9c are side-elevational views of the heat press of the first embodiment, illustrating the manner in which the leveling members thereof facilitate the rotation of the left and right upper platen into parallel relation with the lower platen during movement toward the press positions.
Figure 9B:
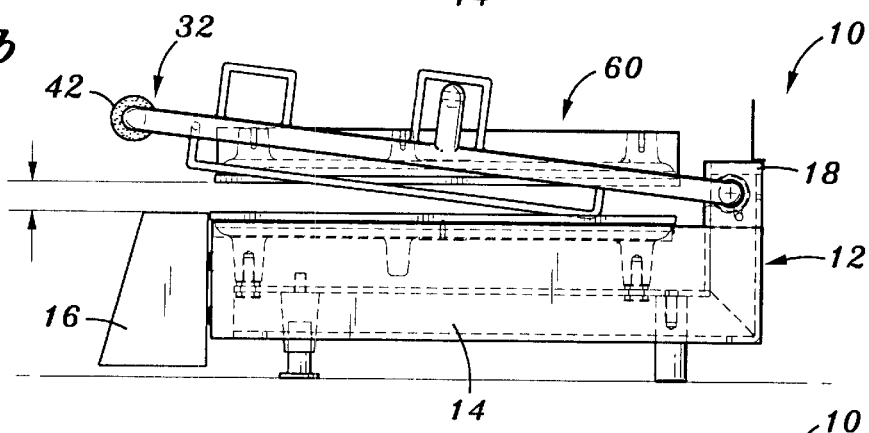
Figure 9C:
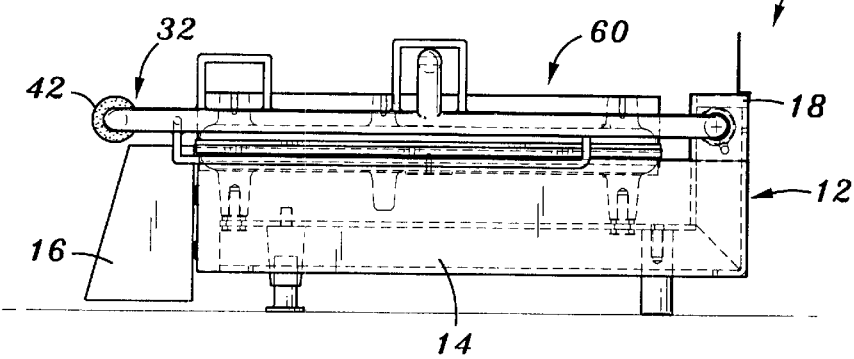

As best seen in FIGS. 9a, 9b and 9c, the left leveling member 54 is configured to facilitate the rotation of the bottom surface 62 of the left upper platen 58 into generally parallel relation to the top surface 22 of the lower platen 20 during the movement of the left actuation handle 30 from its loading/unloading position to its press position. In an identical manner, the right leveling member 56 is configured to facilitate the rotation of the bottom surface 62 of the right upper platen 56 into generally parallel relation to the top surface 22 of the lower platen 20 during the movement of the right actuation handle 32 from its loading/unloading position to its press position. Thus, the leveling members 54, 56 are operative to cause the bottom surfaces 62 of the upper platens 58, 60 and the top surface 22 of the lower platen 20 to be extended along horizontal, generally parallel planes. The result of this "leveling" of the bottom surfaces 62 is the substantial elimination of the uneven application of compressive forces to a quantity of dough or food item flattened/baked between the lower platen 20 and the upper platens 56, 58 alone or in combination. As indicated above, the uneven application of compressive forces often results in the burning or scorching of the food item, or the uneven baking thereof.

In addition to being configured to eliminate the uneven application of compressive forces to food items as discussed above, the configuration of the press 10 provides other advantages over those known in the prior art. As also indicated above, the ability to move the actuation handles 30, 32 individually between their press and loading/unloading positions serves to maximize cycle times through the press 10. For example, while a food item is being flattened/baked between the left upper platen 58 and lower platen 20, a fully baked food item may be removed from between the right upper platen 60 and lower platen 20, with an unbaked food item then being placed therebetween. After the right actuation handle 32 is moved from its loading/unloading position to its press position, the left actuation handle 30 may be moved from its press position to its loading/unloading position, with this sequence being repeated between the actuation handles 30, 32 to maximize productivity.

The use of the press 10 in this manner also minimizes its recovery time due to the inclusion of the separate left and right heating elements 26, 28 within the lower platen 20 and the separate left and right heating elements 64, 66 within respective ones of the left and right upper platens 58, 60. For example, when the left actuation handle 30 is moved to its loading/unloading position, the left heating elements 26, 64 are afforded time to recover (i.e., climb back to their pre-set operating temperatures) during the process of removing the flattened/baked food item from the left half of the lower platen 20 and placement of a new, unflattened/unbaked food item thereupon. While this loading/unloading and recovery process is occurring, another food item is simultaneously being flattened/baked between the right upper platen 60 and right half of the lower platen 20. Moreover, optimal energy utilization efficiency may be achieved by, for example, activating only the left heating elements 26, 64 if the size and volume of food items to be flattened/baked is such that only the left upper platen 58 and left half of the lower platen 20 need be utilized for such production. Even if the upper platens 58, 60 are ganged through the use of the latching mechanism such that the entire surface area of the top surface 22 and combined surface areas of the bottom surfaces 62 are used all at once, the recovery time of the lower platen 20 during the unloading and loading process for the food items upon the concurrent movement of the actuation handles 30, 32 to the loading/unloading position is reduced by the integration of the heating elements 26, 28 directly into the lower platen 20.

The press 10 of the present invention further comprises left and right stop members 70, 72 which are attached to the back wall 18 of the housing 12 and extend generally perpendicularly from the top surface thereof in spaced relation to each other. The left stop member 70 is operative to engage the left upper platen 58 in a manner causing the same, and in particular the bottom surface 62 thereof, to be extended in generally perpendicular relation to the top surface 22 of the lower platen 20 when the left actuation handle 30 is moved to its loading/unloading position. In the same manner, the right stop member 72 is operative to engage the right upper platen 60 in a manner causing the same, and in particular the bottom surface 62 thereof, to be extended in generally perpendicular relation to the top surface 22 of the lower platen 20 when the right actuation handle 32 is moved to its loading/unloading position. Thus, due to the action of the stop members 70, 72, excessive counter space is not required for the press 10 since the upper platens 58, 60 are not caused to swing rearwardly beyond the back wall 18 of the housing 20 as would otherwise occur due to the functionality of the leveling members 54, 56.

Figure 10:
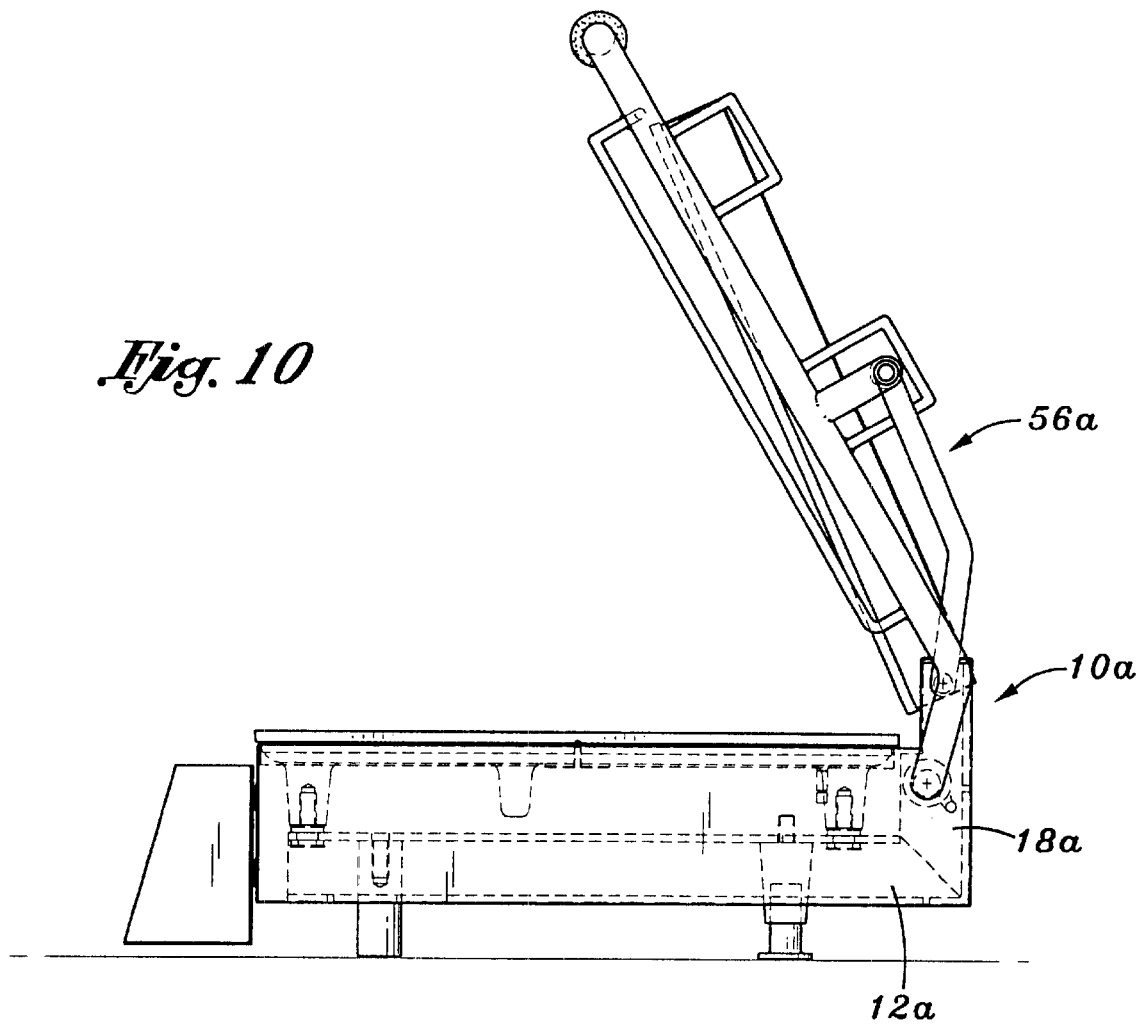
FIG. 10 is a side-elevational view of a heat press constructed in accordance with a second embodiment of the present invention and including an alternative leveling member.

Referring now to FIG. 10, there is depicted a press 10a constructed in accordance with a second embodiment of the present invention. The press 10a of the second embodiment is substantially similar in structure and function to the previously described press 10. The primary structural distinction between the presses 10, 10a lies in each leveling member 56a of the press 10a comprising an elongate linkage as opposed to a bearing. One end of each such linkage is pivotably connected to the back wall 18a of the housing 12a, with the opposite end thereof being cooperatively engaged to the corresponding actuation handle and the corresponding upper platen of the press 10a. The linkages, like the bearings, serve to level the upper platens of the press 10a in the above-described manner upon the movement of the corresponding actuation handles from their loading/unloading positions to their press positions.

Figure 11A:
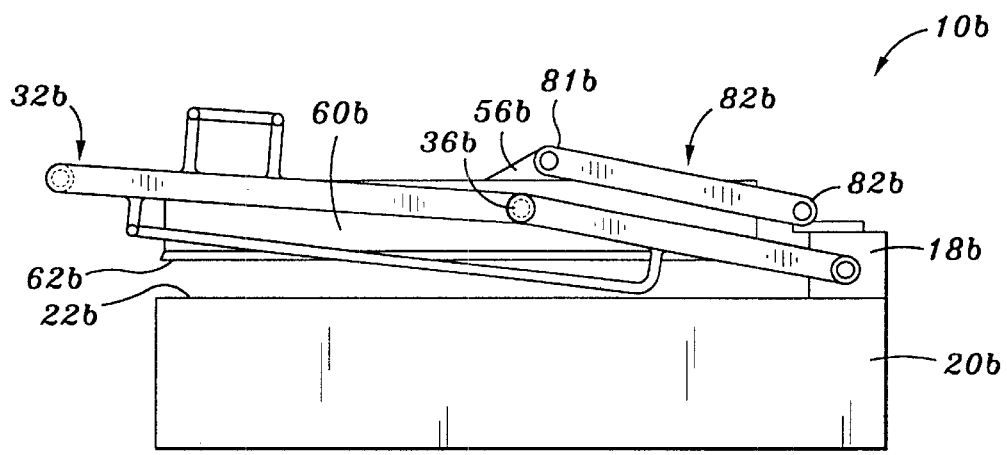
FIGS. 11a and 11b are side-elevational views of a heat press constructed in accordance with a third embodiment of the present invention and defining an alternative attachment of each actuation handle to the respective upper platen.
Figure 11B:
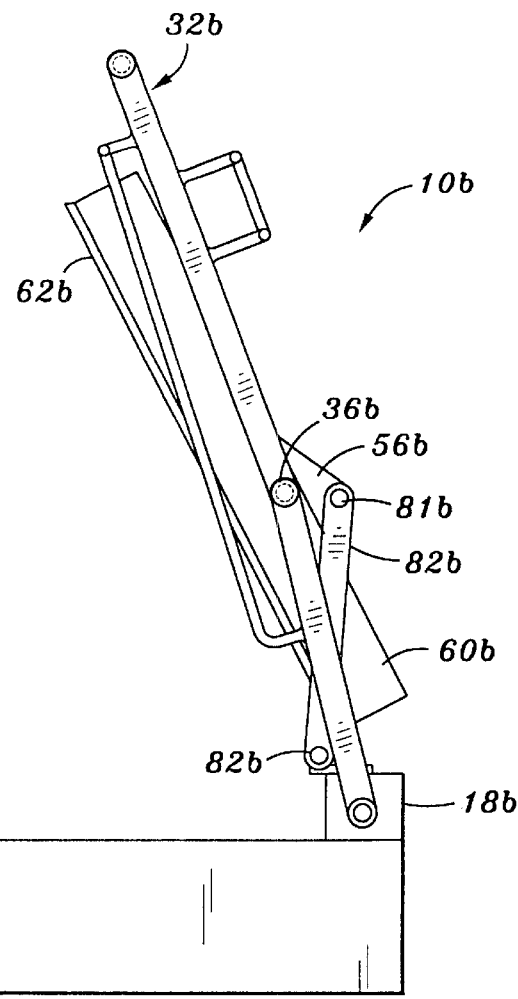

Referring now to FIGS. 11a and 11b, a press 10b constructed in accordance with a third embodiment of the present invention is illustrated. The press 10b of the third embodiment is generally alike in structure and function to the press 10a of the second embodiment. However, the press 10b is distinguishable therefrom in that the point of attachment of each leveling member's elongated linkage 82b and the respective actuation handle 32b are no longer shared at the corresponding upper platen 60b of the press 10b. More specifically, the center portion 36b of each actuation handle 32b may be shortened and reconfigured so as to be engaged to the respective side of the upper platen 60b, not to the leveling member 56b. Further, the attachment of each linkage 82b generally remains the same as that of the second embodiment. Simply put, each linkage 82b and the corresponding actuation handle 32b form a four-point link (best shown in FIG. 11a).

Due to the above structural relationship, when transitioning between the press position and the loading/unloading position, each upper platen 60b of the press 10b is configured to translate and form a parallel relationship with respect to the top surface 22b of the bottom platen 20b when within a prescribed distance range. For instance, when each upper platen 60b moves from the press position to the loading/unloading position, the end of the linkage 82b and the corresponding actuation handle 32b that are adjacent the back wall 18b are adapted to move toward one another after exceeding the prescribed distance range so as to eventually form a cris-cross formation (as shown in FIG. 11b). In this regard, it may be stated that each upper platen 60b is capable of translating upwards in relation to the top surface 22b while forming parallel relation therewith when within the prescribed distance range, and rotate thereafter subsequent to exceeding the prescribed distance range. The prescribed distance range can be anywhere from 0.1 to 5 inches from the top surface 22b of the bottom platen 20b, but preferably 2.5 inches therefrom. By doing so, the linkage 82b facilitates the corresponding upper platen 60b to be maintained in a parallel relationship with respect to the top surface 22b until the prescribed distance range is exceeded so that the food placed therebetween can be evenly pressed and cooked at all times.

Additional modifications and improvements of the present invention may also be apparent to those of ordinary skill in the art. For example, the actuation handles 30, 32 need not necessarily extend perpendicularly relative to the top surface 22 of the lower platen 20 when in their loading/unloading positions. In this respect, the force exerted by the torsion springs 52 against the activation handles 30, 32 may be sufficient to maintain the same at less than a ninety degree angle relative to the top surface 22 when in the loading/unloading position. In this instance, the movement of the actuation handles 30, 32 to extend perpendicularly relative to the top surface 22 could be characterized as a cleaning position. Thus, the particular combination of parts described and illustrated herein is intended to represent only certain embodiments of the present invention, and is not intended to serve as limitations of alternative devices within the spirit and scope of the invention.

What is claimed is:

1. A manually actuated press, comprising:

a housing;

a lower platen attached to the housing and defining a generally planar top surface;

at least one upper platen in mechanical communication with the housing and defining a generally plated bottom surface, the at least one upper platen being translatable with respect to the lower platen in a manner forming a generally planar relationship between the bottom and top surfaces when within a prescribed distance range therefrom, the at least one upper platen being rotatable with respect to the lower platen when exceeding the prescribed distance range; and an actuation handle having a center portion connected to the at least one upper platen and a second end connected to the housing, the actuation handle being selectively movable between a loading/unloading position and a press position relative to the housing.

2. The press of claim 1 further comprising at least one heating element embedded in the lower platen.

3. The press of claim 1 further comprising at least one heating element disposed within the upper platen.

4. The press of claim 1 wherein the housing comprises a back wall section and the second end of the actuation handle is pivotally connected thereat.

5. The press of claim 1 further comprising a stop member attached to the housing and operative to engage the at least one upper platen in a manner causing the bottom surface to be extended in a generally perpendicular relation to the top surface when the actuation handle is moved to the loading/unloading position.

6. The press of claim 5 further comprising a torsion spring cooperatively engaged to the actuation handle and operative to maintain the actuation handle in the loading/unloading position.

7. The press of claim 1 further comprising a leveling member mounted on the at least one upper platen, the leveling member being configured to facilitate the rotation of the bottom surface into generally parallel relation to the top surface during movement of the actuation handle from the loading/unloading position to the press position.

8. The press of claim 7 wherein the leveling member comprises an elongate linkage having first and second ends, the first end being connected to the leveling member, the second end being connected to the housing.

9. The press of claim 8 wherein the housing comprises a back wall and the second end of the elongate linkage is pivotally connected thereat.

10. The press of claim 8 wherein the center portion of the actuation handle and the first end of the elongate linkage are uniformly spaced apart from each other during movement of the actuation handle between the loading/unloading position and the press position.

11. The press of claim 8 wherein the second end of the elongate linkage is configured to move toward the second end of the actuation handle when moving from the press position to the loading/unloading position.

12. The press of claim 11 wherein the elongate linkage crisscrosses the actuation handle when the loading/unloading position is formed.

13. The press of claim 1 wherein the prescribed distance range is between 0.1 to 5 inches.

14. The press of claim 13 wherein the prescribed distance range is about 2.5 inches.

15. The press of claim 1 wherein the at least one upper platen comprises two upper platens.

16. The press of claim 1, wherein the upper platen is rotatable with respect to the actuation handle when the bottom surface is within the prescribed distance range of the top surface.

17. A manually actuated press, comprising:

a housing;

a lower platen attached to the housing and defining a generally planar top surface;

at least one upper platen in mechanical communication with the housing and defining a generally plated bottom surface, the at least one upper platen being translatable with respect to the lower platen in a manner forming a generally planar relationship between the bottom and top surfaces when within a prescribed distance range therefrom, the at least one upper platen being rotatable with respect to the lower platen when exceeding the prescribed distance range; and an actuation handle having a first connection to the at least one upper platen and a second connection to the housing, the actuation handle being selectively movable between a loading/unloading position and a press position relative to the housing.

* * * * *